(12) United States Patent
Ahmed et al.

(10) Patent No.: US 12,056,642 B2
(45) Date of Patent: Aug. 6, 2024

(54) METHOD AND SYSTEM FOR AUTOMATIC TECHNICAL ASSISTANCE

(71) Applicant: Infosys Limited, Bangalore (IN)

(72) Inventors: Syed Ahmed, Bangalore (IN); Raajesh Laguduva Rameshbabu, Madurai (IN); Yuvaraj Vellore Chandrasekaran, Vellore (IN); Ramjee Rajasekaran, Chennai (IN); Dinesh Bavikati, Ananthapur (IN); Ramji Thillai Chithambaram, Bangalore (IN)

(73) Assignee: INFOSYS LIMITED, Bangalore (IN)

( * ) Notice: Subject to any disclaimer, the term of this patent is extended or adjusted under 35 U.S.C. 154(b) by 459 days.

(21) Appl. No.: 17/345,673

(22) Filed: Jun. 11, 2021

(65) Prior Publication Data

US 2022/0101217 A1 Mar. 31, 2022

(30) Foreign Application Priority Data

Sep. 30, 2020 (IN) .............................. 202041042524

(51) Int. Cl.
| | | |
|---|---|---|
| G06K 9/00 | (2022.01) | |
| G06Q 10/0633 | (2023.01) | |
| G06T 5/70 | (2024.01) | |
| G06T 5/92 | (2024.01) | |
| H04L 67/306 | (2022.01) | |
| H04L 67/50 | (2022.01) | |

(52) U.S. Cl.
CPC .......... *G06Q 10/0633* (2013.01); *G06T 5/70* (2024.01); *G06T 5/92* (2024.01); *H04L 67/306* (2013.01); *H04L 67/535* (2022.05)

(58) Field of Classification Search
CPC ........ G06T 5/002; G06T 5/009; H04L 67/306
See application file for complete search history.

(56) References Cited

U.S. PATENT DOCUMENTS

| 11,422,680 | B1* | 8/2022 | Mahapatra | ............ G06F 3/0484 |
|---|---|---|---|---|
| 2010/0254139 | A1* | 10/2010 | Juang | ...................... F21K 9/232 |
| | | | | 362/249.02 |

(Continued)

FOREIGN PATENT DOCUMENTS

| CN | 101304483 A | * | 11/2008 | ............. G06T 5/002 |
|---|---|---|---|---|
| WO | WO-2019191810 A1 | * | 10/2019 | ............. G06F 3/011 |

OTHER PUBLICATIONS

Modern Software Product Support Processes and the Usage of Multimedia Formats, Parmit K. Chilana et al., CHI, 2011, pp. 3093-3102 (Year: 2011).*

(Continued)

*Primary Examiner* — Jayesh A Patel
(74) *Attorney, Agent, or Firm* — Troutman Pepper Hamilton Sanders LLP (Rochester)

(57) ABSTRACT

A method and system for automatic technical assistance is provided. The technical assistant is first trained using the user profile of the users who will be accessing the technical assistant, and the workflow details. The technical assistant continuously monitors user screen and checks if the user is on the correct screen for the required workflow. Based on user confirmation an RPA bot resolves the error for the user. In an embodiment, the bot completes the workflow for the user. The bot may also provide guidance content to the user to help the user realize the error.

14 Claims, 5 Drawing Sheets

(56) References Cited

U.S. PATENT DOCUMENTS

| | | | |
|---|---|---|---|
| 2013/0254139 A1 | 9/2013 | Lei | |
| 2018/0219807 A1* | 8/2018 | Thinguldstad | H04L 51/02 |
| 2018/0219921 A1* | 8/2018 | Baer | H04L 51/046 |
| 2019/0265865 A1 | 8/2019 | Yaseen et al. | |
| 2020/0034281 A1* | 1/2020 | Hamid | G06F 11/3692 |
| 2020/0379889 A1* | 12/2020 | Hamid | G06F 11/3688 |
| 2021/0173718 A1* | 6/2021 | Patel | G06F 40/295 |
| 2021/0176361 A1* | 6/2021 | Wang | G06N 3/08 |
| 2021/0224818 A1* | 7/2021 | Choudhary | G06F 3/04895 |
| 2022/0032457 A1* | 2/2022 | Anand | G06V 40/20 |
| 2022/0032471 A1* | 2/2022 | Singh | G06F 3/0484 |
| 2022/0035641 A1* | 2/2022 | Singh | G06F 3/0484 |
| 2022/0108106 A1* | 4/2022 | Sathi | G06V 30/19173 |
| 2022/0147386 A1* | 5/2022 | Goyal | G06F 9/4881 |

OTHER PUBLICATIONS

Fast Euclidean distance transformation in two scans using a 3 3 neighborhood, Frank Y. Shih et al., Elsevier, 2004, pp. 195-205 (Year: 2004).*

New Algorithms for Euclidean Distance Transformation of an n-Dimensional Digitized Picture With Applications, Toyofumi Saito et al., Pergamon, 1994, pp. 1551-1565 (Year: 1994).*

MedKiosk: An Embodied Conversational Intelligence via Deep Learning, Pui Huang Leong et al., IEEE, 2017, pp. 1-6 (Year: 2017).*

DIA: A Human AI Hybrid Conversational Assistant for Developing Contexts, Vikram Kamath Cannanure et al., ACM, Jun. 2020, pp. 1-5 (Year: 2020).*

Virtual Customer Service: Building your Chatbot, David N. Sousa et al., ACM, 2019, pp. 174-179 (Year: 2019).*

Transforming the communication between citizens and government through AI-guided chatbots, Aggeliki Androutsopoulou et al., Elsevier, 2019, pp. 358-367 (Year: 2019).*

* cited by examiner

METHOD AND SYSTEM FOR AUTOMATIC TECHNICAL ASSISTANCE

This application claims the benefit of Indian Patent Application Serial No. 202041042524 filed Sep. 30, 2020, which is hereby incorporated by reference in its entirety.

FIELD

This technology generally relates to technical assistance for users. More specifically it relates to an automated technical assistance.

BACKGROUND

In traditional support operations, A user when faced with an issue with a workflow needs to contact help desk either via a call or log a ticket through a portal. Some of the automated assistant automated technical assistant agent configured to receive request to initiate technical support, communicate response, receive selection of the one of the responses, and provide course of action to the user. However, a user assistant to understand user profile, user intent, and issue will be able to resolve and thereby provide faster resolution and greater user experience.

SUMMARY

A method for providing automatic technical assistance, comprising providing a set of parameters relating to each user from a set of users, a set of workflows, and a data relating to the set of workflows to the technical assistant. It further comprises receiving a request from a user from the set of users for technical assistance regarding a workflow from the set of workflows, assisting the user by resolving the error by the technical assistant, wherein the resolving comprises periodically capturing an image of a screen of a user device, processing each of the captured image to identify if the user is on a right page for the workflow, using the provided set of workflows and the data relating to the set of workflows, processing a set of inputs for the workflow, provided by the user, to identify an error in the set of inputs, using the provided set of parameters relating to the user, and assisting the user based on the above processing and navigating the user to complete the workflow; or based on user confirmation perform one of completing the workflow by the technical assistant, or providing a guiding content to the user to resolve the error.

A system for providing automatic technical assistance, comprising one or more processors, a memory coupled to one or more processors which are configured to execute programmed instructions stored in the memory which comprises providing to the technical assistant, a set of parameters relating to each user from a set of users, a set of workflows, and a data relating to the set of workflows; receiving a request from a user from the set of users, for technical assistance regarding a workflow from the set of workflows; assisting the user by resolving the error by the technical assistant, wherein the resolving comprises periodically capturing an image of a screen of a user device, processing each of the captured image to identify if the user is on a right page for the workflow, using the provided set of workflows and the data relating to the set of workflows, processing a set of inputs for the workflow, provided by the user, to identify an error in the set of inputs, using the provided set of parameters relating to the user; and assisting the user based on the above processing and navigating the user to complete the workflow; or based on user confirmation perform one of completing the workflow by the technical assistant, or providing a guiding content to the user to resolve the error.

DETAILED DESCRIPTION

Figure 1:
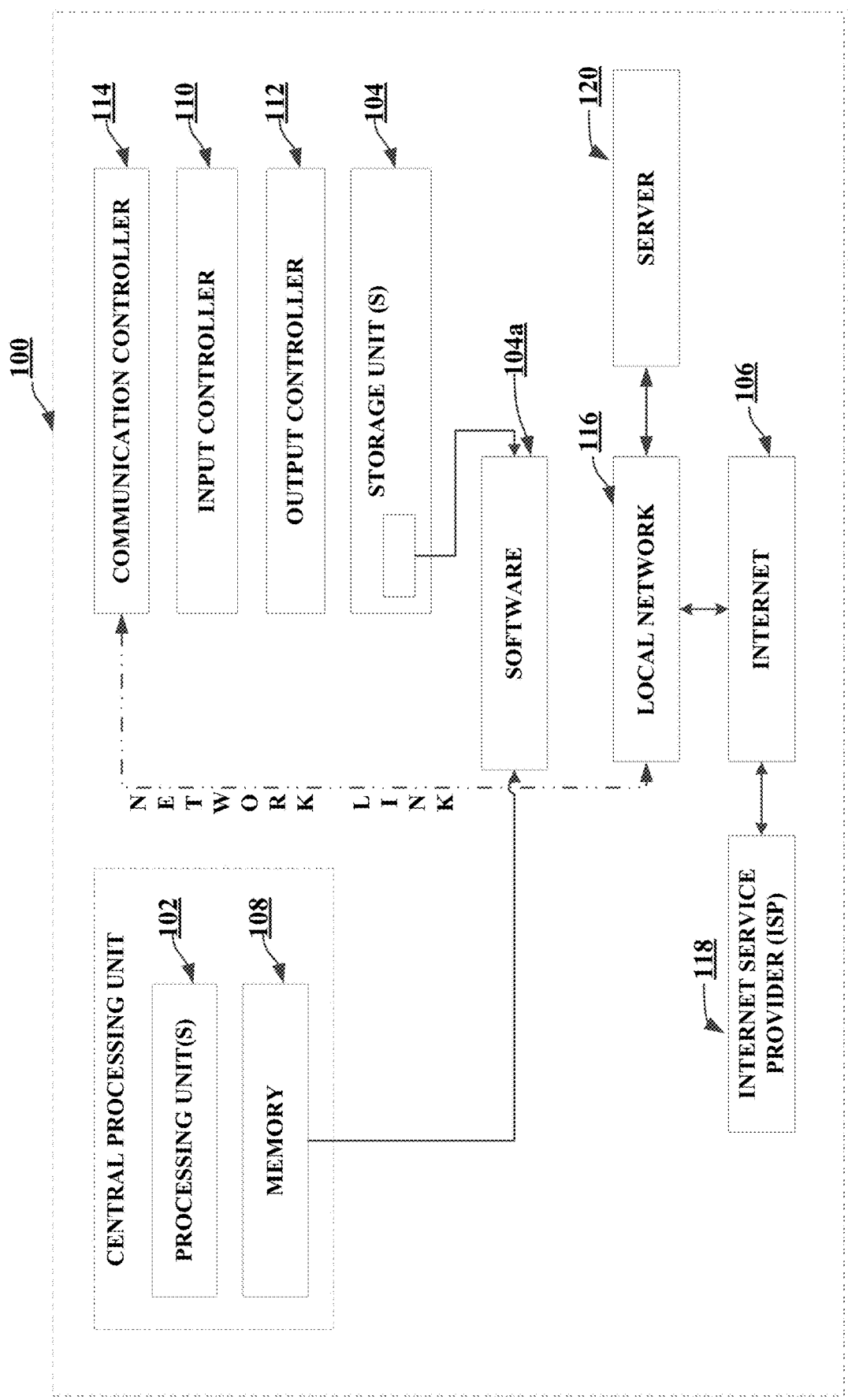
FIG. 1 is an exemplary network environment

FIG. 1 is a block diagram of a computing device 100 to which the present disclosure may be applied according to an embodiment of the present disclosure. The system includes at least one processor 102, designed to process instructions, for example computer readable instructions (i.e., code) stored on a storage device 104. By processing instructions, processing device 102 may perform the steps and functions disclosed herein. Storage device 104 may be any type of storage device, for example, but not limited to an optical storage device, a magnetic storage device, a solid state storage device and a non-transitory storage device. The storage device 104 may contain software 104*a* which is a set of instructions (i.e. code). Alternatively, instructions may be stored in one or more remote storage devices, for example storage devices accessed over a network or the internet 106. The computing device also includes an operating system and microinstruction code. The various processes and functions described herein may either be part of the microinstruction code or part of the program (or combination thereof) which is executed via the operating system. Computing device 100 additionally may have memory 108, an input controller 110, and an output controller 112 and communication controller 114. A bus (not shown) may operatively couple components of computing device 100, including processor 102, memory 108, storage device 104, input controller 110 output controller 112, and any other devices (e.g., network controllers, sound controllers, etc.). Output controller 110 may be operatively coupled (e.g., via a wired or wireless connection) to a display device (e.g., a monitor, television, mobile device screen, touch-display, etc.) in such a fashion that output controller 110 can transform the display on display device (e.g., in response to modules executed). Input controller 108 may be operatively coupled (e.g., via a wired or wireless connection) to input device (e.g., mouse, keyboard, touchpad, scroll-ball, touch-display, etc.) in such a fashion that input can be received from a user. The communication controller 114 is coupled to a bus (not shown) and provides a two-way coupling through a network link to the internet 106 that is connected to a local network 116 and operated by an internet service provider (hereinafter referred to as 'ISP') 118 which provides data communication services to the internet. Network link typically provides data communication through one or more networks to other data devices. For example, network link may provide a connection through local network 116 to a host computer, to data equipment operated by an ISP 118. A server 120 may transmit a requested code for an application through internet 106, ISP 118, local network 116 and communication controller 114.

Of course, FIG. 1 illustrates computing device 100 with all components as separate devices for ease of identification only. Each of the components may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 100 may be one or more servers, for example a farm of networked servers, a clustered server environment, or a cloud network of computing devices.

Although an exemplary computing device 100 and its components are described and illustrated herein, other types and numbers of systems, devices in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

Figure 2:
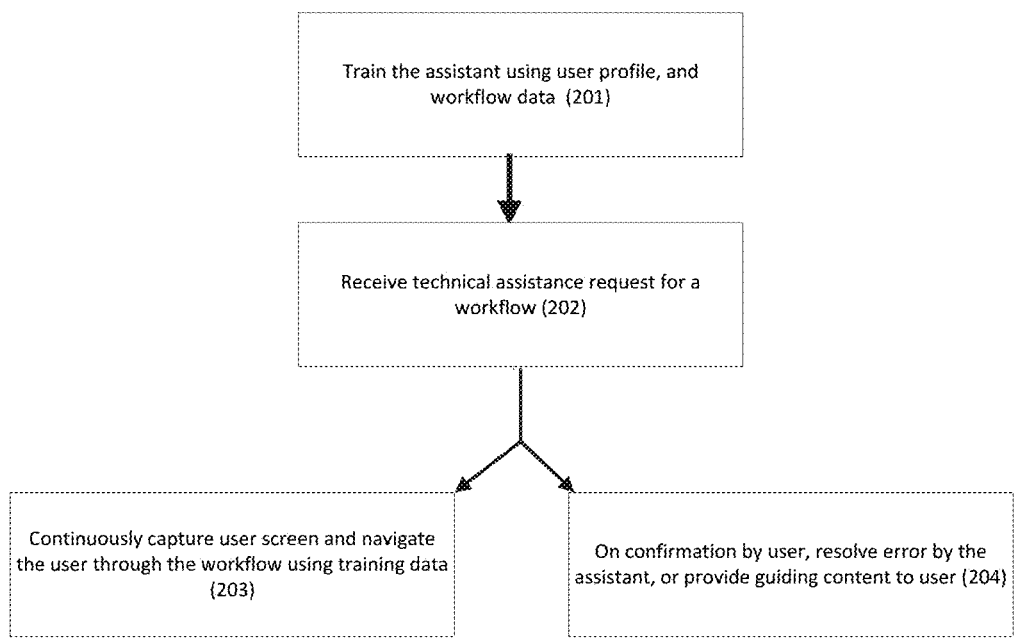
FIG. 2 is a flowchart of an exemplary method for implementing the technical assistant.
Figure 3:
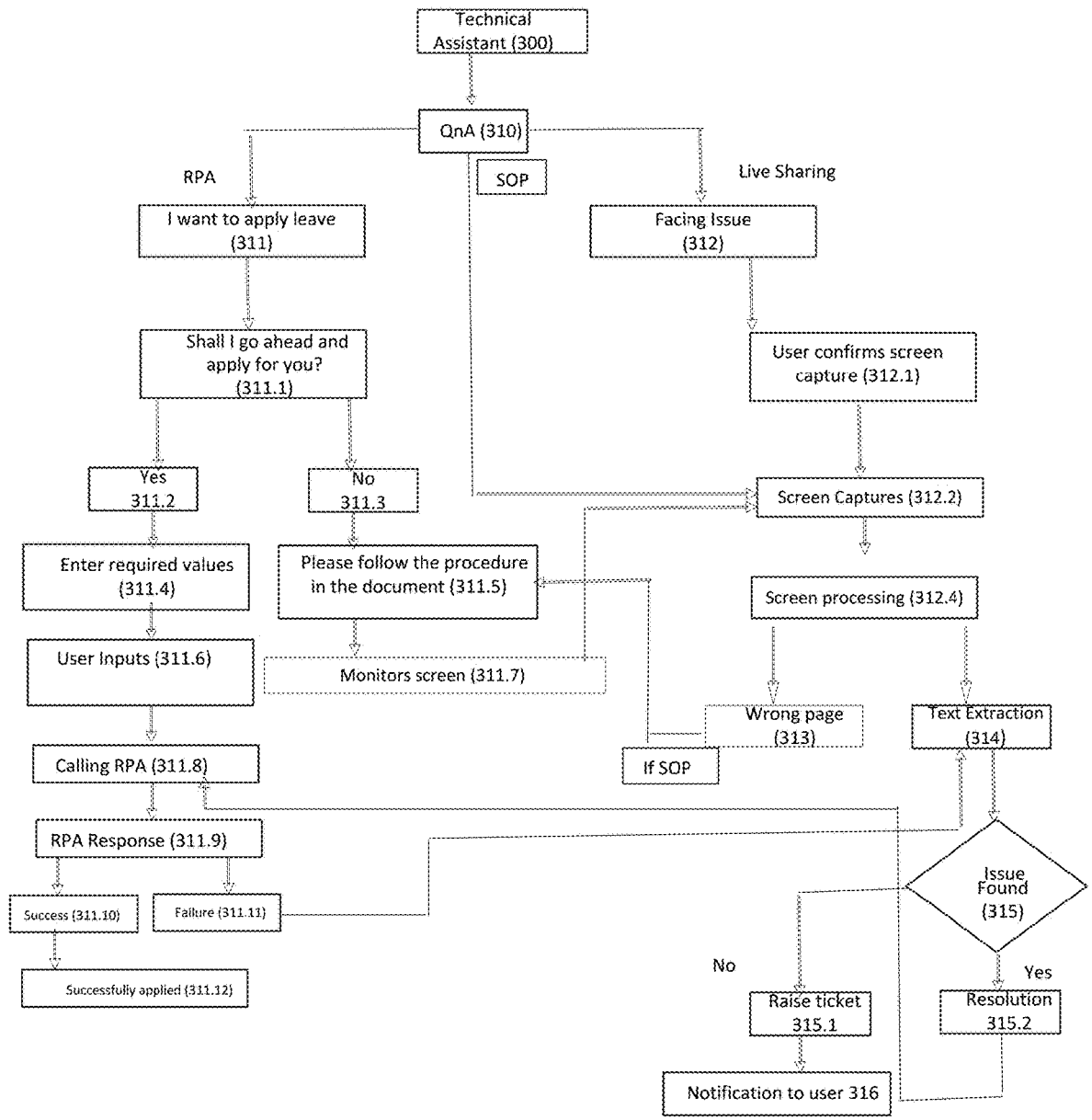
FIG. 3 is a detailed flowchart of an exemplary method for implementing the technical assistant.

An exemplary method for providing automatic technical assistant will broadly be described along with FIG. 2. In step 201 the technical assistant is first trained using the user profile of the users who will be accessing the technical assistant. The user profile may contain the access rights associated with the user. In another embodiment the user profile may also contain the workflow policies associated with the user. The technical assistant is also trained with the workflows and the its processes which will be used by the users. The screens of the workflows in the user system, are used to train the technical assistant.

In step 202 a user raises a request for technical assistance for an error he got while using a workflow. If user confirms for live assistance, the technical assistant asks the user to share his screen. The technical assistant then checks is the user is on the correct screen for the required workflow.

In step 203, the technical assistant periodically captures the user screens while the user tries to access the workflow. The technical assistant keeps analyzing the screens captured, and informs the user when he makes an error leading to the error. Message.

In step 204, alternatively, if user confirms for error resolving, an RPA bot resolves the error for the user. In an embodiment, the bot completes the workflow for the user. The bot may also provide guidance content to the user to help the user realize the error. In an embodiment the guidance content may include video, documents, image files or any other appropriate format.

An exemplary method for providing automatic technical assistant will be described in detail along with FIG. 2.

For any given application in a system, there can be many workflows or functional flows and that becomes the standard operation procedures. Every workflow can have one or more steps and every steps can have one or more corresponding user screens in a user device. Some of the workflows can be happy workflows or unhappy workflows. For e.g. In a banking application, when you want to transfer funds from account A to account B, happy scenarios is when you are able to successfully transfer funds from A to B. If there is a failure in the workflow such as unable to find payee, unable to transfer funds, or insufficient funds are part of unhappy workflows. Each of the happy and unhappy workflows can be thought of a workflow for the technical assistant and having their own flows of screens.

The bot (300) is trained initially with the workflow details. The details of the workflow may include the workflow steps and corresponding screens of the user interface, from the user's device. The technical assistant may have access to user profile information to identify the user access levels or rights in a system, priori transaction information of the user, intent of the user to determine what the user is trying to do and if the action is allowed. In another embodiment, all the workflows and their respective steps and screens of an application are stored along with additional details such as resolutions steps, error information, NER information, RPA availability, etc. These details may be stored in a repository accessible the technical assistant. The screens are stored in vectorized form. Any known computer vision technology can be used to convert the screens from the user interface. In one embodiment, the technical assistant and the training details maybe saved in a repository on the server. This may also be saved on the cloud.

In one embodiment, named entity recognition or any other technology for entity recognition, is used on the captured screen to save all the possible labels and the respective patterns for the functionalities in an application.

The resolution of the errors maybe pre-saved with the technical assistant in a database. It will provide the solutions to the user after referring the error in the database.

In an embodiment, when a user faces an error while using a workflow in an application, he initiates the technical assistant (300). The technical assistant provides options to the user and asks him to choose. Technical assistant may ask if the user wants an error resolution, or if an RPA process may complete the workflow on behalf of the user (310).

Each option and the subsequent process will now be described further. The first description will be for the user selecting the option of error resolution (312). In an embodiment, this option uses live sharing of the user screen. The user shares his screen with the technical assistant (312.1). In one embodiment the technical assistant accesses user screen by capturing images of the user screen (312.2). The technical assistant can use any existing technology to capture the user screens.

The user performs the workflow and the technical assistant analyses the user screen in real time, continuously. The captured screen maybe captured, processed and transferred to the required technology and implementation platform as required by the user. The captured screen from the user screen maybe converted to vector form. These images are compared with the vector form of the images initially saved in the repository, while training the technical assistant. In an embodiment, when a screen image is captured, the technical assistant will convert that into a vector and finds the Euclidean distance with the initially saved vectors. The technical assistant also extracts the labels and text from the captured image and match the pattern in extracted text with the stored labels. All this is done in real time and continuously as the user progresses to further steps in the workflow.

In one embodiment, the technical assistant may process the image before analyzing and matching with the image vectors stored initially. The technical assistant may add pixels to the boundaries of the image, adjust the light intensity of the image, remove the anomalies and noise from the image. The technical assistant may use any other image processing steps to improve and change the image quality as needed.

In an embodiment, the technical assistant then uses text extraction to analyses the labels and text in the captured image. This can be done through Optical Character Recognition or Named Entity Recognition or any other appropriate technology that can be used for text extraction. The extracted text is then compared with the text and labels stored initially while training the technical assistant.

In an embodiment, the text matching maybe done using regular expressions. Any other technology that provides text matching can also used by the technical assistant for matching the text extracted from the captured images.

The technical assistant may perform the image processing, text extraction and matching in real time, as the user keeps progressing with the workflow. The technical assistant may capture the screen image as per a time interval set by the user. After every preconfigured time interval, e.g. 5 seconds, the technical assistant may capture an image, process the image, extract the text and perform image and text matching.

In an embodiment, the technical assistant maybe trained with user details. As previously mentioned, the technical assistant may have access to user profile information to identify the user access levels or rights in a system, priori transaction information of the user, intent of the user to determine what the user is trying to do and if the action is allowed. The text extracted from the captured user screen is analyzed and matched with the user access and levels stored with the technical assistant. Accordingly, the technical assistant can perform all matching and conclude if the user has navigated to wrong screen is there is a screen mismatch, or if there is user access error.

As the user navigates through the workflow after initiating the technical assistant and confirming the screen share, the technical assistant captures the user screen periodically, processes and analyse it. Based on the screen matching, if the technical assistant concludes that the user is at the right workflow for his intent, the user tries to extract the text as described above and use the text, labels and user profile details saved with the technical assistant. Hereby the technical assistant can identify if the user has given wrong entry on the page or screen. The user may have tried a workflow which is not accessible to him, or the user may have provided invalid inputs.

In an embodiment, where the technical assistant identifies that the text input provided by user is invalid, it may provide a notification to the user about the error and help resolve the error. The technical assistant may provide a resolution message also to the user. Accordingly the user can decide the next steps or if he wishes to continue with the workflow. In one embodiment, the error can be resolved by triggering an RPA to complete the process. The RPA may complete the workflow on behalf of the user. It may prompt the user to choose a correct option to provide for the workflow. In another embodiment, it can be any other function or process configured to take appropriate inputs from the user and complete the workflow. If the technical assistant is unable to identify the error after screen match and text match, then a ticket is raised with a backend technical assistant team.

In one embodiment, if the technical assistant identifies after a screen match that the user is at the wrong screen, or a wrong workflow of a Standard Operating Procedure, he may be directed to the right workflow. Alternatively, the user maybe provided a guidance artifact suggesting the right workflow.

The description will now elaborate the technical assistant process if the user initially selects RPA process instead of error resolution. In an embodiment the RPA process confirms from the user if RPA process should finish the workflow. Once confirmed the RPA process may take the values to be entered from the user and finish the process appropriately. In an embodiment if the RPA process faces an error while completing the workflow for the user, the technical assistant may extract the text from the screen and match with the text details stored with the technical assistant. The technical assistant may be notified about the error in the text entered or it may be directed to raise a ticket with the backend team of the technical assistant.

If the user selects that he does not want the RPA process to finish the workflow, then the user may be guided to finish the workflow using appropriate tutorials. The tutorials are configurable as per the user requirements, the workflow, and the screens. In one embodiment, as the user completes the workflow using the tutorial the technical assistant continuously monitors the screen.

Figure 4:
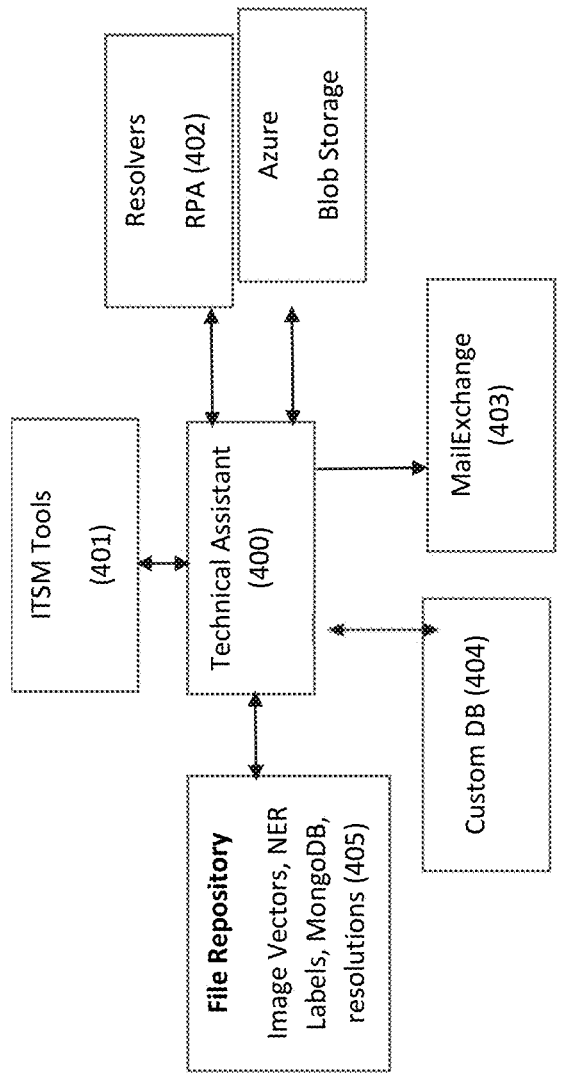
FIG. 4 is an illustration of the architecture for implementing the technical assistant.

An exemplary architecture for implementing the technical assistant will be explained along with FIG. 4. In an embodiment the technical assistant is integrated with appropriate components for implementing the technical assistant and various processes associated with the technical assistant. The components can be installed locally in the user machine or in the server machine along with the technical assistant, or can be remotely accessed in any other connected machine.

In an embodiment, the technical assistant maybe configured to be integrated with an ITSM tool. The ITSM tool enables the technical assistant to raise and service requests as needed by the technical assistant.

In one embodiment, the technical assistant maybe configured to be integrated with RPA process. The RPA process may be triggered when a user selects the option of RPA assistance. In one embodiment, the RPA process may be triggered when the technical assistant is unable to identify the error by screen sharing. The technical assistant may be configured to trigger the RPA at any other appropriate time of user assistance.

In one embodiment the technical assistant may be configured to integrate with the notifying components to notify the user as appropriate. The notifying component can be a mail exchange server, or a messaging server, or any other component as appropriate. The user may be notified in case a ticket is raised for the error faced by the user. The user may be notified when a ticket is resolved. The technical assistant may be configured to notify the user at any other appropriate time.

In one embodiment the technical assistant maybe integrated with configurable databases and repository. These data storage can be cloud based, custom database, file repositories or any other database. These can be used for storing any structure of data. The technical may be configured to store screens in vector form, text extracted from screens, user profiles and other related data. These data can be retrieved and processed during the process of user assistance. These data storage can also be configured to store the error resolution details, corresponding to various possible errors in a workflow.

The technical assistant can be integrated with any other appropriate components for the configurable implementation. The components can be integrated using any known communication means. Other appropriate components maybe audio components, user interface components, analytics components and other such components.

In one embodiment, the components of the architecture for implementing the technical assistant can be installed and integrated through separate systems in a network or in a cloud ecosystem.

Figure 5:
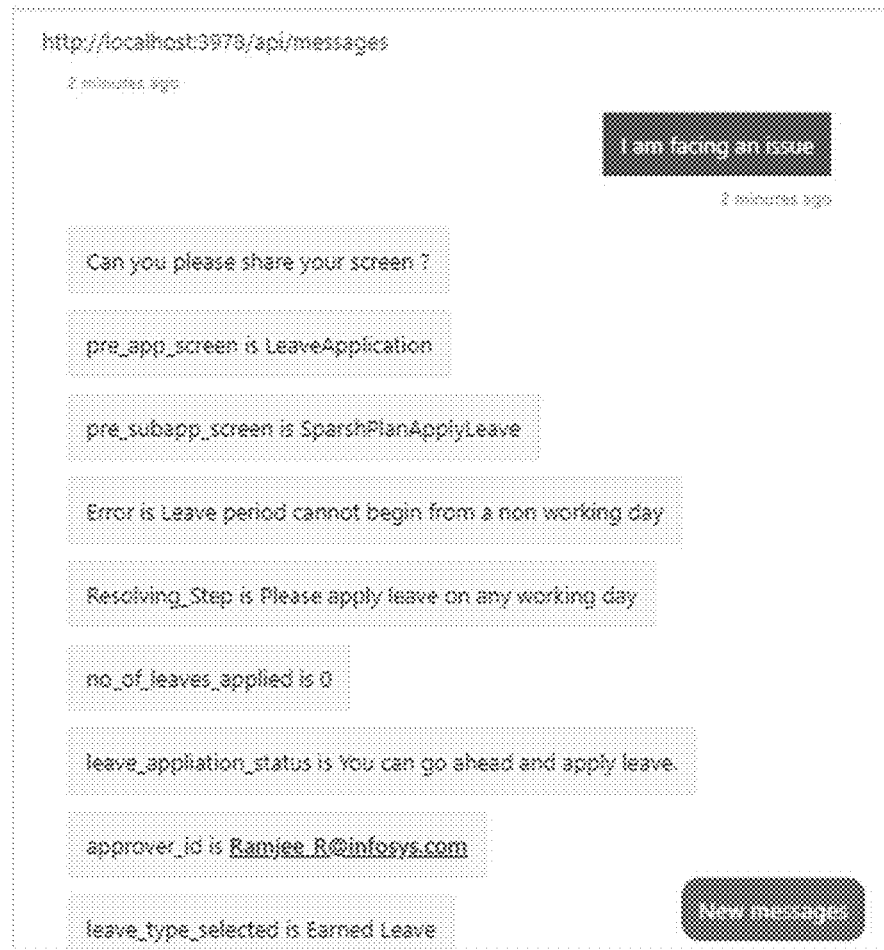
FIG. 5 is an exemplary technical assistant as per the disclosure.

An exemplary technical assistant as per the disclosure will be explained along with FIG. 5. The explanation given below is only by way of example in one user scenario, for the purpose of illustration. This should not be considered limiting by any means.

In the present example, a user tries to apply for leaves in his organization. The user faces error while applying leaves. The error maybe that 'Leave cannot be applied'. The user initiates the technical assistant to help resolve the error.

If the user opts for error resolving, the technical assistant asks user if it can access the user screen. The technical assistant then captures the user screen continuously as the user progresses through the leave application workflow. For the purpose of this example, we can consider that the technical assistant uses Flask platform to capture the screen. The technical assistant keeps converting the captured into vector forms and compare with the vector details available in its repository. OneShot learning converts the screen into vector form. In this example, if the user is on the correct screen, the technical assistant will get a correct match and notify that the user is on 'LeaveApplication' screen.

Next the technical assistant will extract the data from the captured screens and use appropriate technology to convert them into text. In this example, the technical assistant uses Tesseract platform to extract the text from the screen and match with its database. Once the technical assistant performs the text matching for the captured screens, it comes across the screen where the user has put dates for the leave. It may find an error in dates and give an Error Message—'Leave period cannot begin from a non-working day'. The technical assistant may also give a Resolving Message—'Please apply leave on any working day'.

Accordingly the technical assistant also provides a list of related parameters, that may be number of leaves available, the name of leave approver or the type of leave to be selected.

The user may select RPA bot assistant to complete the workflow. The bot will take leave dates from the user and apply the leaves for the user. If the user confirms, the technical assistant may provide guiding document or a video to the user so that user can complete the workflow on his own. Alternatively, technical assistant can raise a ticket if the error is not resolved.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for providing automatic technical assistance, the method comprising:
    training, by a processor, a technical assistant using:
        a provided set of parameters relating to each user from a set of users,
        a set of workflows, and
        data relating to the set of workflows;
    receiving a request, by the processor from a user from the set of users, for technical assistance regarding a workflow from the set of workflows; and
    assisting the user by the processor by:
    resolving an error by the processor using the technical assistant, wherein the resolving comprises:
    capturing, by the processor, a plurality of images of a screen of a user device in real time,
    processing each of the plurality of captured images, by the processor, to identify if the user is on a right page for the workflow, using the set of workflows and the data relating to the set of workflows, wherein processing each of the plurality of captured images comprises:
    converting, by the processor, each of the plurality of captured images to a plurality of vectors, and
    comparing each vector, by the processor, with a vector of corresponding images used to train the technical assistant,
    processing, by the processor, a set of inputs for the workflow provided by the user, to identify the error in the set of inputs, using the provided set of parameters relating to the user, and
    assisting the user, by the processor, based on the above processings and navigating the user to complete the workflow.

2. The method as claimed in claim 1, further comprising creating, by the processor, a ticket for the user for resolving the error.

3. The method as claimed in claim 1, wherein the provided set of parameters relating to each user comprises an identifier for the user, the access available to the user, and a set of one or more policies related to the user.

4. The method as claimed in claim 1, wherein the data relating to the set of workflows comprises a process for each workflow from the set of workflows, and one or more related screens for each of the process.

5. The method as claimed in claim 1, wherein the processing each of the plurality of captured images comprises adjusting, by the processor, the brightness of each of the plurality of captured images using pixels, removing, by the processor, anomalies from each of the plurality of captured images and removing, by the processor, noise from each of the plurality of captured images.

6. The method as claimed in claim 1, wherein from each of the processed plurality of captured images, a set of parameters is extracted and compared with the provided set of parameters relating to each user, to identify the error.

7. The method as claimed in claim 1, further comprising:
    receiving, by the processor, user profile information from a repository; and
    based on the user profile information, identifying by the processor, user access levels of the user, prior transaction information associated with the user, intent of the user, and if the request from the user is allowed.

8. A system for providing automatic technical assistance, comprising:
- one or more processors;
- a memory coupled to the one or more processors which are configured to execute programmed instructions stored in the memory comprising:
- training a technical assistant using,
- a provided set of parameters relating to each user from a set of users,
- a set of workflows, and
- data relating to the set of workflows;
- receiving a request from a user from the set of users, for technical assistance regarding a workflow from the set of workflows; and
- assisting the user by:
- resolving an error using the technical assistant, wherein the resolving comprises:
- capturing a plurality of images of a screen of a user device in real time, processing each of the plurality of captured images to identify if the user is on a right page for the workflow, using the set of workflows and the data relating to the set of workflows, wherein processing each of the plurality of captured images comprises:
- converting, by the one or more processors, each of the plurality of captured images to a plurality of vectors, and comparing each vector, by the one or more processors, with a vector of corresponding images used to train the technical assistant,
- processing a set of inputs for the workflow, provided by the user, to identify the error in the set of inputs, using the provided set of parameters relating to the user, and assisting the user based on the above processings and navigating the user to complete the workflow.

9. The system as claimed in claim 8, further comprising creating a ticket for the user for resolving the error.

10. The system as claimed in claim 8, wherein the provided set of parameters relating to each user comprises an identifier for the user, the access available to the user, and a set of one or more policies related to the user.

11. The system as claimed in claim 8, wherein the data relating to the set of workflows comprises a process for each workflow from the set of workflows, and one or more related screens for each of the process.

12. The system as claimed in claim 8, wherein the processing each of the plurality of captured images comprises adjusting the brightness of each of the plurality of captured images using pixels, removing anomalies from each of the plurality of captured images, and removing noise from each of the plurality of captured images.

13. The system as claimed in claim 8, wherein from each of the processed plurality of captured images, a set of parameters is extracted and compared with the provided set of parameters relating to each user, to identify the error.

14. A non-transitory computer readable medium having stored thereon instructions for providing automatic technical assistance, comprising machine executable code which when executed by at least one processor, causes the at least one processor to perform steps comprising:
- training a technical assistant using,
- a set of parameters relating to each user from a set of users,
- a set of workflows, and
- a data relating to the set of workflows;
- receiving a request from a user from the set of users, for technical assistance regarding a workflow from the set of workflows; and
- assisting the user by:
- resolving an error using the technical assistant, wherein the resolving comprises:
- capturing a plurality of images of a screen of a user device in real time,
- processing each of the plurality of captured images to identify if the user is on a right page for the workflow, using the set of workflows and the data relating to the set of workflows, wherein processing each of the plurality of captured images comprises:
- converting each of the plurality of captured images to a plurality of vectors, and
- comparing each vector with a vector of corresponding images used to train the technical assistant,
- processing a set of inputs for the workflow provided by the user, to identify the error in the set of inputs, using the set of parameters relating to the user, and assisting the user based on the above processings and navigating the user to complete the workflow.

* * * * *